(12) United States Patent
Cabana et al.

(10) Patent No.: US 12,442,406 B2
(45) Date of Patent: Oct. 14, 2025

(54) FASTENING ASSEMBLY FOR A TRACK

(71) Applicant: International Truck Intellectual Property Company, LLC, Lisle, IL (US)

(72) Inventors: Cameron Cabana, Chicago, IL (US); Emma Langer, Naperville, IL (US); Hector R. Kiely, Plainfield, IL (US); Stephen Burd, Lombard, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 266 days.

(21) Appl. No.: 17/881,663

(22) Filed: Aug. 5, 2022

(65) Prior Publication Data

US 2024/0044355 A1 Feb. 8, 2024

(51) Int. Cl.
*F16B 37/04* (2006.01)
*B64D 11/06* (2006.01)

(52) U.S. Cl.
CPC ........ *F16B 37/045* (2013.01); *B64D 11/0696* (2013.01)

(58) Field of Classification Search
CPC ........................... F16B 37/045; B64D 11/0696
USPC ..................................................... 411/84, 85
See application file for complete search history.

(56) References Cited

U.S. PATENT DOCUMENTS

| | | | |
|---|---|---|---|
| 1,677,514 A | 7/1928 | Derr | |
| 2,005,547 A | 6/1935 | Johnson | |
| 2,391,100 A | 12/1945 | Mott | |
| 2,393,431 A * | 1/1946 | Torburn | F16B 37/045 411/929 |
| 2,757,020 A | 7/1956 | Orelind | |
| 2,814,059 A | 11/1957 | Philip | |
| 3,279,972 A | 10/1966 | Thassy | |
| 3,398,800 A | 8/1968 | Bennett | |
| 3,401,436 A | 9/1968 | Bradshaw | |
| 3,433,118 A | 3/1969 | Ward | |
| 3,664,434 A | 5/1972 | Connor et al. | |
| 3,847,344 A * | 11/1974 | Kulczycki | B64D 11/0696 403/348 |
| 3,915,469 A | 10/1975 | Vanice | |
| 4,087,928 A | 5/1978 | Mickus | |
| 4,317,580 A | 3/1982 | Scarnato et al. | |
| 4,416,573 A | 11/1983 | Matalis et al. | |
| 4,630,982 A * | 12/1986 | Fenner | B61D 45/001 403/381 |
| 4,796,837 A | 1/1989 | Dowd | |
| 5,222,851 A * | 6/1993 | Dickerson | E03D 11/16 411/397 |
| 5,230,485 A * | 7/1993 | Vogg | B64D 9/00 244/118.6 |
| 5,302,065 A * | 4/1994 | Vogg | B64D 11/0696 411/85 |
| 5,520,357 A * | 5/1996 | Payne | B61D 45/006 244/118.6 |

(Continued)

*Primary Examiner* — Flemming Saether
(74) *Attorney, Agent, or Firm* — Mark C. Bach; Umang Khanna (57) ABSTRACT

A fastening assembly for a track comprises a stud having a stud base and a rod extending from the stud base, a keeper having a keeper base with an opening corresponding to the rod in a center of the keeper base, at least two members extending from the keeper base, and a nut receiving and engaging the rod to secure the stud to the keeper.

5 Claims, 8 Drawing Sheets

(56) References Cited

U.S. PATENT DOCUMENTS

| | | | |
|---|---|---|---|
| 5,794,901 A * | 8/1998 | Sigel | G09B 25/02 |
| | | | 248/221.11 |
| 5,823,727 A * | 10/1998 | Lee | F16B 37/045 |
| | | | 411/85 |
| 5,947,672 A | 9/1999 | Cohen | |
| 6,854,749 B2 | 2/2005 | Gurudutt et al. | |
| 7,347,189 B2 | 3/2008 | Anello et al. | |
| 7,641,426 B2 | 1/2010 | Stubbe | |
| 7,731,443 B2 | 6/2010 | Batdorff et al. | |
| 7,780,198 B2 | 8/2010 | Taylor et al. | |
| 9,393,895 B2 * | 7/2016 | Cardona | B60N 2/01558 |
| 2005/0276677 A1 * | 12/2005 | Andersson | F16B 21/02 |
| | | | 411/553 |

* cited by examiner

FASTENING ASSEMBLY FOR A TRACK

FIELD

The present disclosure generally relates to a fastener and method of fastening More particularly, embodiments described relate to a fastening assembly for a track.

BACKGROUND

Applications that rely on components being coupled and uncoupled from one another utilize fasteners instead of more permanent attachment solutions like welding, soldering, and adhesives. Fastener design may be driven by the specific application, including how often components need to be decoupled, the strength or nature of the coupling, ease of use, and so forth. Yet, some fasteners are limited in their application because of their design.

Some fastening applications use tracks to secure objects in place. For example, airplane seats may be secured to a cabin floor by using one or more tracks. Some track designs may include multiple holes that are spaced apart at a fixed distance, and connected by a common channel. The channel allows fasteners to slide along the track, while the holes define positions where the fasteners can secure an object to the track. This track design, however, may limit the possible locations where the object may be fastened, as well as the number of objects that may be fastened to the track. Although a different pitch may be used for holes on a track, this would require modifying track design and retrofitting, which may be costly, labor intensive, and cause delays.

Therefore, a need exists for method of fastening that has broader applicability. A new approach for fastening objects on a track is needed.

SUMMARY

A fastening assembly for a track comprises a stud having a stud base and a rod extending from the stud base, a keeper having a keeper base with an opening corresponding to the rod in a center of the keeper base, at least two members extending from the keeper base, and a nut receiving and engaging the rod to secure the stud to the keeper.

DETAILED DESCRIPTION

The present disclosure provides a technical solution that allows an object to be secured to a track with greater flexibility, and without need for track redesign or retrofitting.

Figure 1A:
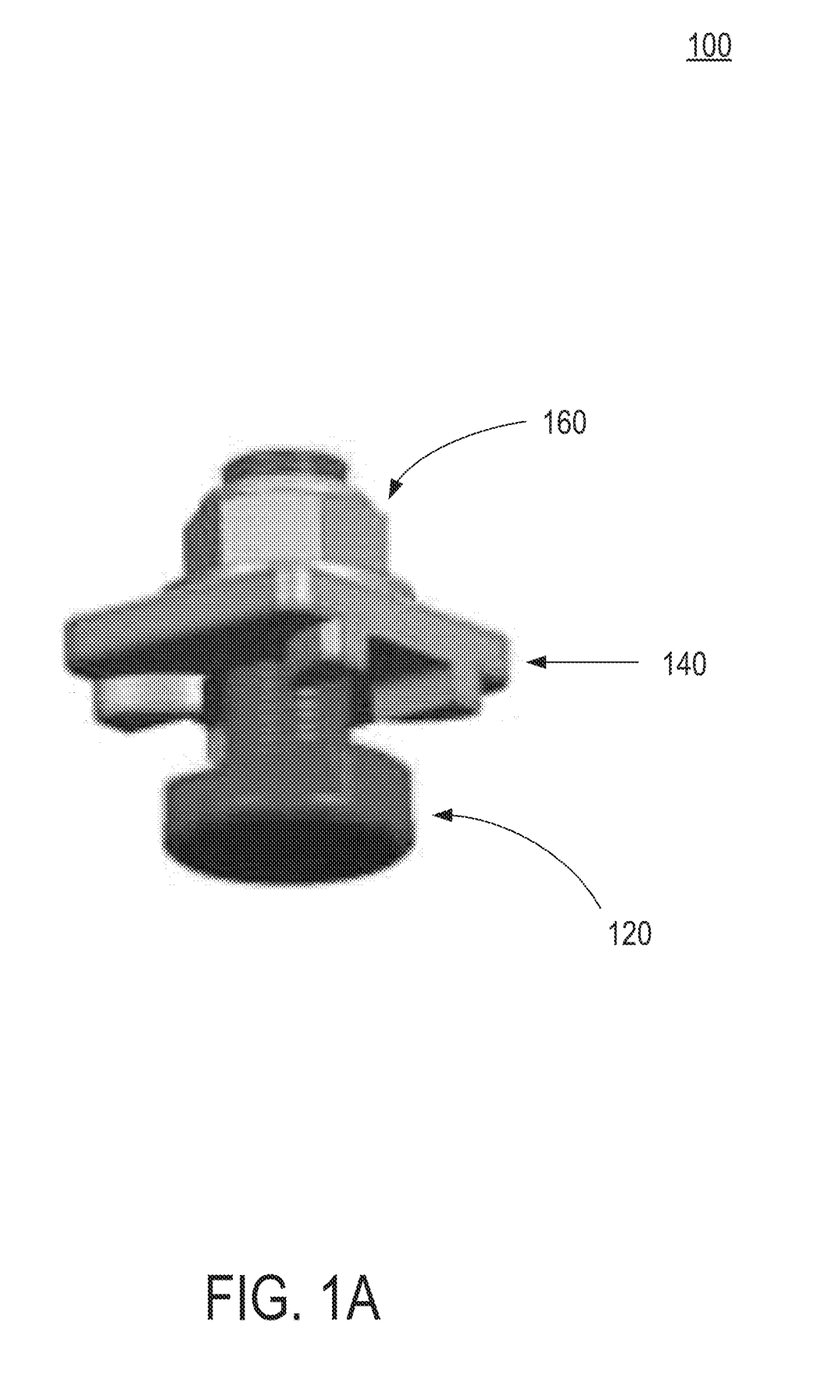
FIG. 1A is a perspective view of an example fastening assembly, according to one embodiment described herein.
Figure 1B:
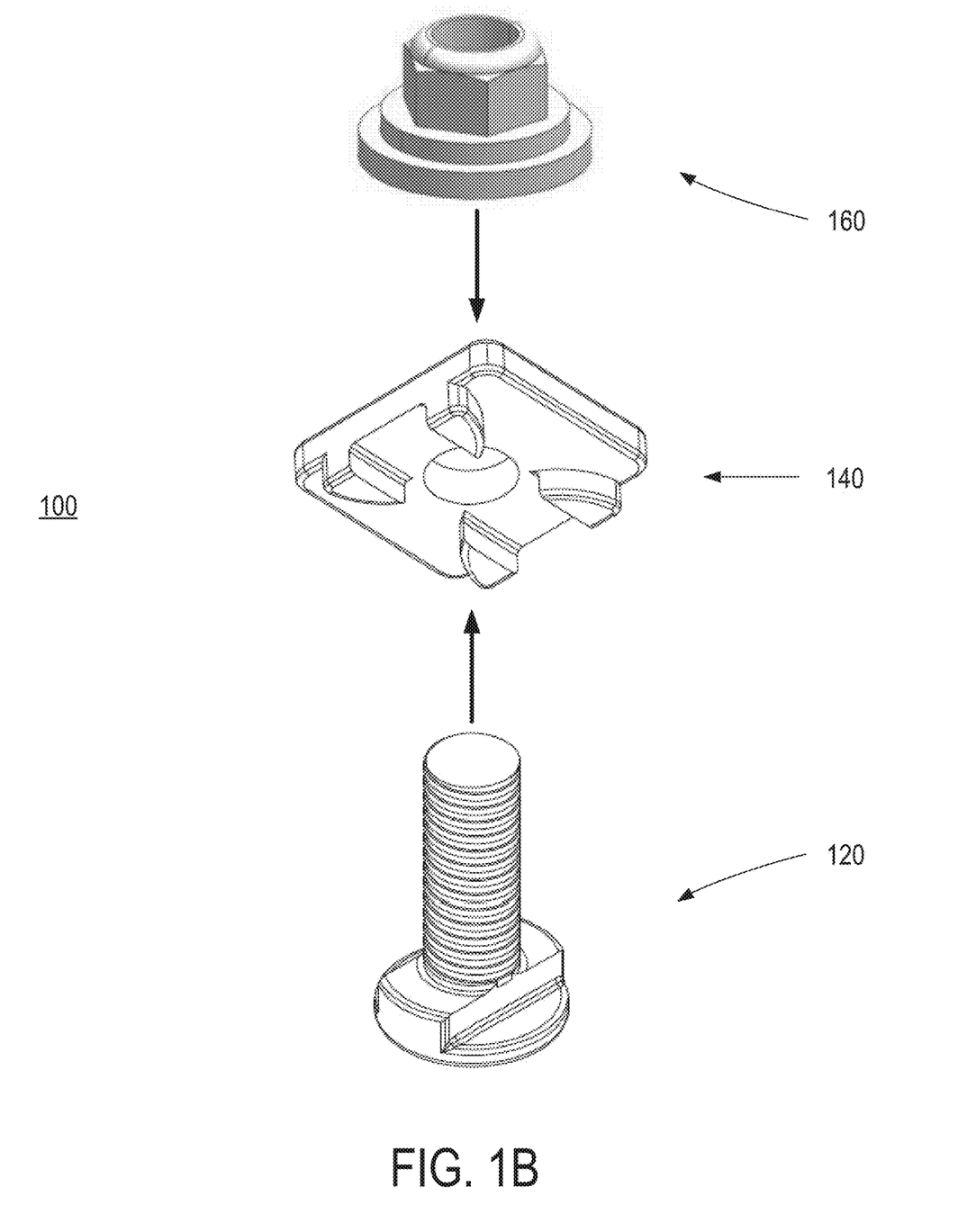
FIG. 1B is an exploded view of the fastening assembly shown in FIG. 1A.

Turning now to FIGS. 1A and 1B, an example fastening assembly 100 is illustrated, according to some embodiments. In general, the fastening assembly 100 includes a stud 120, a keeper 140, and a nut 160, as shown in the exploded view of FIG. 1B. The stud 120, keeper 140, and nut 160 may be operably coupled together to form the fastening assembly 100. In particular, when assembled, the stud 120 engages the nut 160 and secures the keeper 140 between the stud 120 and the nut 160, as shown in FIG. 1A. Material used to make the fastening assembly 100, in accordance with embodiments described herein, is not limited. For example, the fastening assembly 100 may be metallic, polymeric, ceramic, or any combination thereof.

Figure 2A:
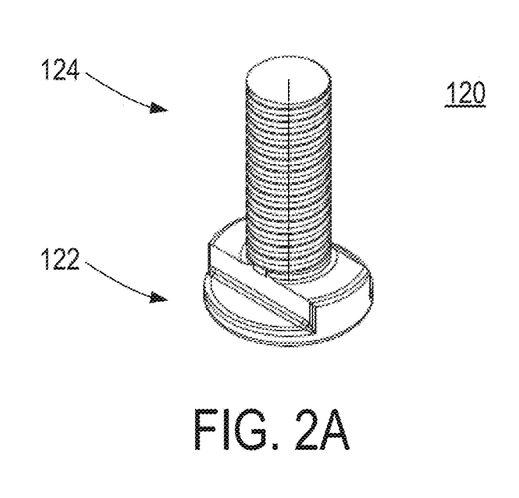
FIG. 2A is a perspective view of an example stud, according to one embodiment described herein.
Figure 2B:
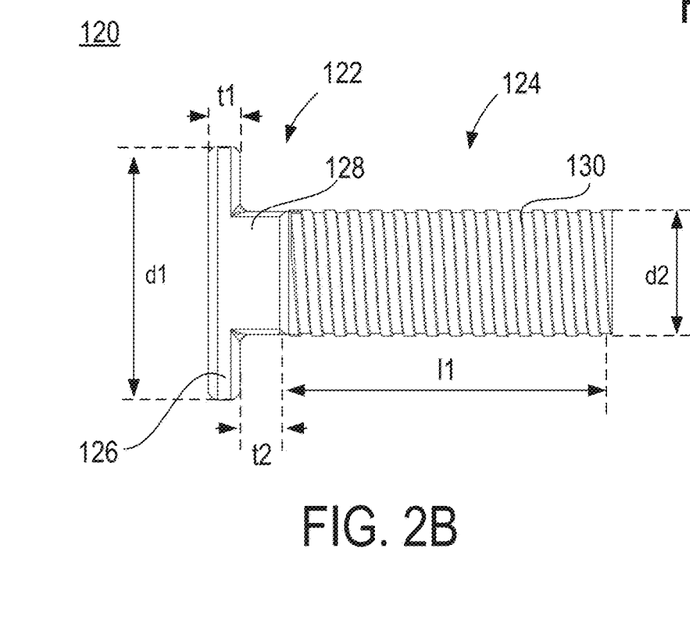
FIG. 2B is a cross-sectional view of the stud shown in FIG. 2A.
Figure 2C:
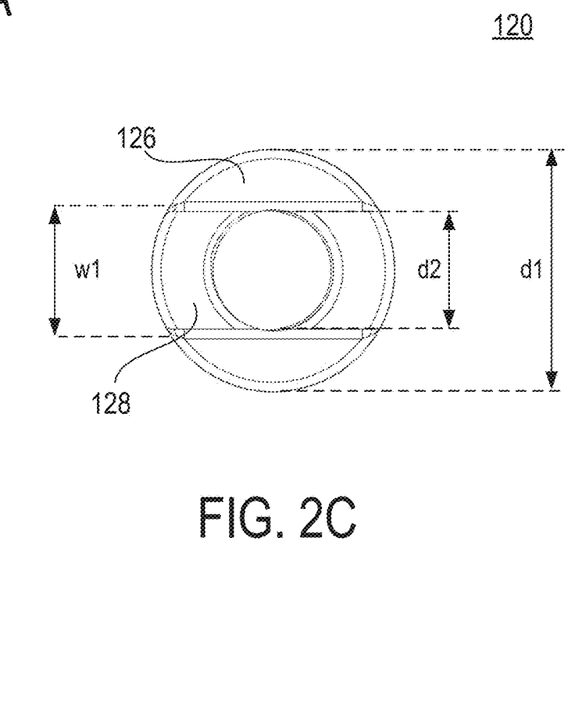
FIG. 2C is a top view of the stud shown in FIG. 2A.

Referring particularly to FIGS. 2A-2C, an example stud 120 is illustrated, according to some embodiments. The stud 120 may include a stud base 122 and a rod 124 that extends from the stud base 122. The stud base 122 may include a first portion 126 and a second portion 128 adjacent to the first portion 126, as shown in FIG. 2B. In some embodiments, the first portion 126 may be defined by a thickness t1 and a diameter d1, and the second portion 128 may be defined by a thickness t2 and a width w1, as shown in FIGS. 2B and 2C. In some embodiments, at least one dimension of the second portion 128 is less than at least one dimension of the first portion 126. For example, the width w1 defining the second portion 128 may be less than the diameter d1 defining the first portion 126, as shown in FIG. 2C. In some embodiments, the rod 124 may include a threaded portion 130 that is connected to, and extends from, the second portion 128, as shown in FIGS. 2A and 2B. The threaded portion 130 may be defined by a length 11, and a diameter d2. In one embodiment, the threaded portion 130 allows a nut 160 to attach to the rod 124 and secure the fastening assembly 100. By receiving and engaging the threaded portion 130, the nut 160 secures the stud 120 to the keeper 140, as well as secures any object coupled to the stud 120, keeper 140, or both. In some embodiments, the width w1 of the second portion 128 is less than the diameter d2 of the threaded portion 130.

Dimensions for stud 120 may vary, depending upon the application. In some non-limiting examples, the diameter d1 of the first portion 126 is between 0.2 and 5 inches, the diameter d2 of the threaded portion 130 is between 0.1 and 4 inches, the width w1 of second portion 128 is between 0.1 and 4 inches, the thickness t1 of the first portion 126 is between 0.1 and 2 inches, the thickness t2 of the second portion 128 is between 0.1 and 2 inches, and the length 11 of the threated portion 130 is between 0.5 and 5 inches, although other dimensions may be possible.

Although FIGS. 2A-2C show specific shapes for the first portion 126 and second portion 128, the shapes of the first portion 126 and/or second portion 128 are not so limited. For example, top and bottom surfaces of the first portion 126 need not be flat, and the shape of the first portion 126 need not be circular, but the surfaces and shapes of the first portion 126 may also be rectangular, square, hexagonal, polygonal, oval, winged, domed, teed, slotted, round, and so forth, or may have an irregular shape. In addition, the first portion 126 may include other features, including various receptacles for receiving and/or engaging a tool, such as a screwdriver, a wrench, pliers, and so forth. Similarly, the second portion 128 need not be rectangular, may be circular, square, rhomboidal, oval, curvilinear, and so forth, as well as have an irregular shape.

Figure 3A:
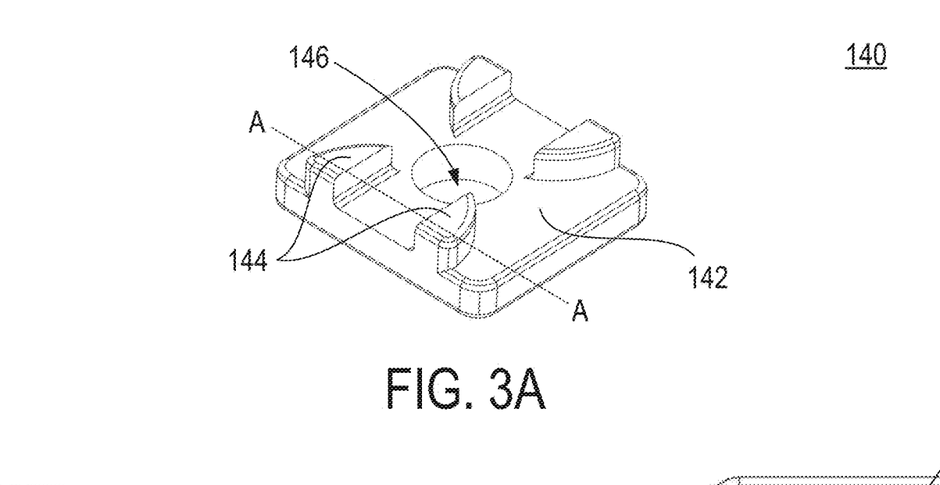
FIG. 3A is a perspective view of an example keeper, according to one embodiment described herein.
Figure 3B:
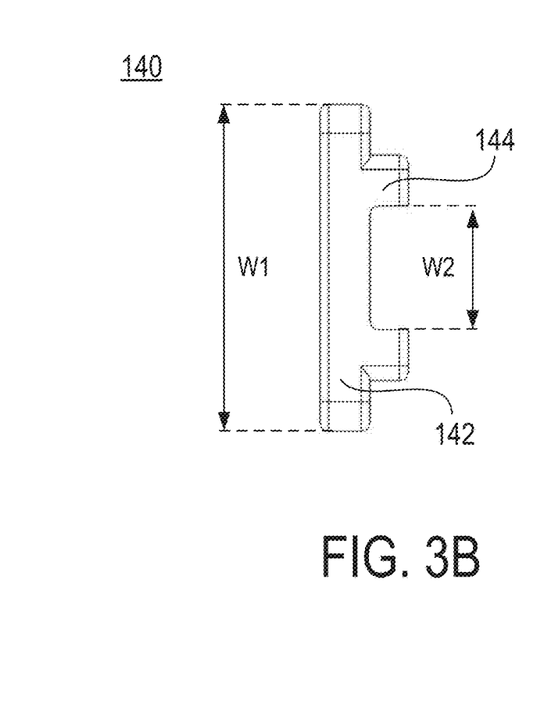
FIG. 3B is a cross-sectional view along line A-A on the keeper shown in FIG. 3A.
Figure 3C:
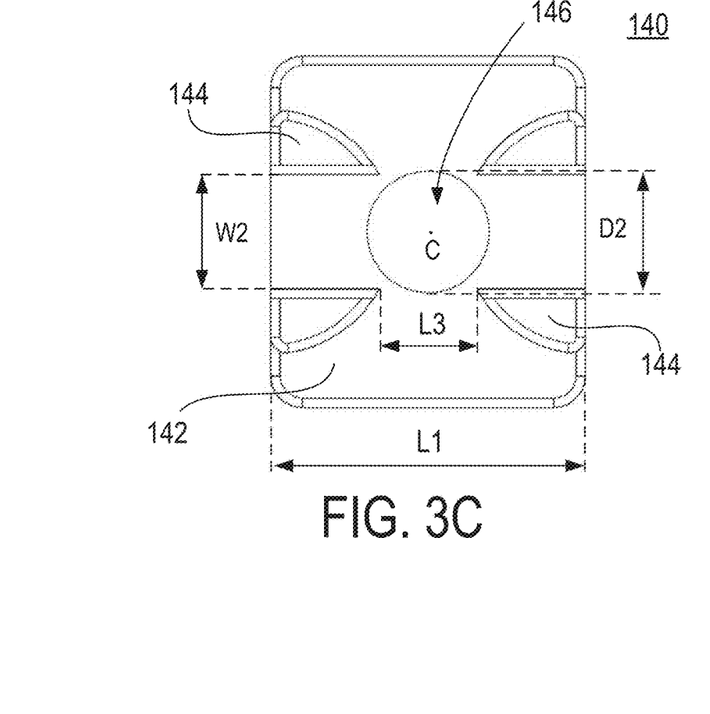
FIG. 3C is a top view of the keeper shown in FIG. 3A.

Turning now to FIGS. 3A-C, an example keeper 140 is illustrated, according to some embodiments. In general, the keeper 140 may include a keeper base 142 and a number of members 144 extending from the keeper base 142. The keeper base 142 may be defined by a width W1 and a length L1. The shape of keeper base 142 is not particularly limited to the example in FIGS. 3A-C, and may have any shape, including a circular, rectangular, hexagonal, polygonal, oval, or other shape, or may have an irregular shape. In some embodiments, any dimension, including length L1 and/or width W1, of the keeper base 142 may be between 0.5 and 5 inches, although other dimensions may be possible.

As shown in FIGS. 3A and 3C, in some embodiments, the keeper 140 may include a number, four being shown in the Figures, members 144 extending from the keeper base 142. In some embodiments, the members 144 and the keeper base 142 may be formed using a single, continuous piece of material. In other embodiments, the members 144 may be formed using more than one piece of material, where the members 144 are attached to the keeper base 142. The members 144 may be separated by a width W2 along the width W1 of the keeper base 142, and by a length L3 along the length L1 of the keeper base 142, as shown in FIGS. 3B and 3C. In some embodiments, dimensions, shapes and positions of the members 144 may be selected to correspond to at least a portion of the stud 120 coupled thereto. More particularly, in some embodiments, the keeper base 142 and members 144 define a space that corresponds to the second portion 128 of the stud base 122 described with reference to FIGS. 2A-2C. For instance, the width W2 separating the members 144 may be selected to be approximately equal to the width w1 of the second portion 128 of the stud 120 shown in FIGS. 2A-2C. As may be appreciated, however, the W2 and width w1 need not be exactly equal, but may be within a small tolerance of each other (e.g. less than 0.1 inches, although other tolerances may be possible) to allow for the positioning of the second portion 128 into the space created by the keeper base 142 and members 144.

In some embodiments, dimensions, shapes, and positions of the members 144 may be selected to correspond to dimensions, shapes, and configuration of a track, or other part or component, to which the fastening assembly 100 is to be secured. For example, as described with reference to FIGS. 4A-4C, a track may include a track body, a channel formed in the track body, a plurality of holes that are connected to the channel, and a plurality of slits that connect the plurality of holes. And so, in some embodiments, dimensions, shapes, and positions of the members 144 may be selected to correspond to, or match at least in part, at least a portion of the holes, as illustrated in FIGS. 5A-5B.

Referring again to FIGS. 3A-3C, the keeper 140 may also include an opening 146 located adjacent a center C of the keeper base 142, as shown. In some embodiments, the size and shape of the opening 146 may correspond to a stud 120. Specifically, the opening 146 may be sized and shaped to receive, and allow therethrough, a rod 124 from the stud 120. In some embodiments, the opening 146 may be sized and shaped to allow the rod 124 therethrough, and prevent lateral movement of the rod 124 once the rod 124 is inserted in the opening 146. For instance, a diameter of the opening 146 may correspond to, or be approximately equal to a diameter of rod 124. As may be appreciated, the diameter of the opening 146 and the diameter of rod 124 need not be exactly equal, but may be within a small tolerance of each other (e.g. less than 0.1 inches, although other tolerances may be possible) to allow the rod 124 to be inserted in and go through the opening 146. In other embodiments, the size and shape of the opening 146 may be sufficient to allow the rod 124 but not the stud base 122 through the opening 146. In some non-limiting examples, the diameter of the opening 146 may be between 0.1 and 1 inches, although other dimensions may be possible.

Figure 3D:
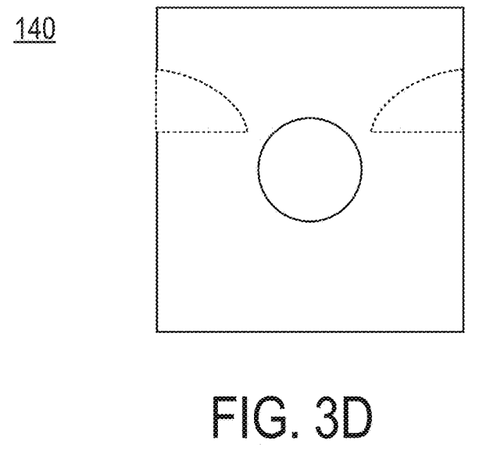
FIG. 3D is a top view of an example configuration of members of a keeper, according to one embodiment described herein.
Figure 3E:
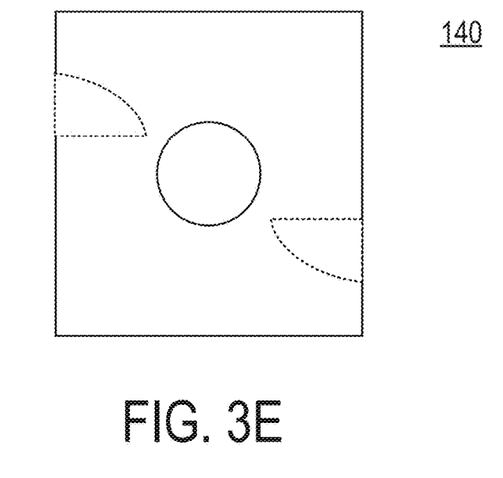
FIG. 3E is a top view of another example configuration of members of a keeper, according to one embodiment described herein.
Figure 3F:
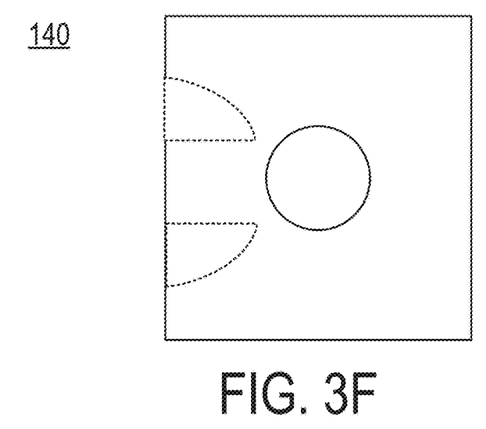
FIG. 3F is a top view of yet another example arrangement of members of a keeper, according to one embodiment described herein.

The example keeper 140 shown in FIGS. 3A-C is not so limited and may include more or fewer members 144, and the members 144 may arranged in various configurations. For instance, in some embodiments, the keeper 140 may include two members 144 arranged in various configurations, as shown in FIG. 3D-3F. In addition, the keeper 140 need not be symmetrical about one or more axes, or with respect to one or more features. For instance, in some embodiments, a center of the opening 146 may be offset in one or more directions relative to the center C of the keeper base 142.

Figures 4A, 4B, 4C:
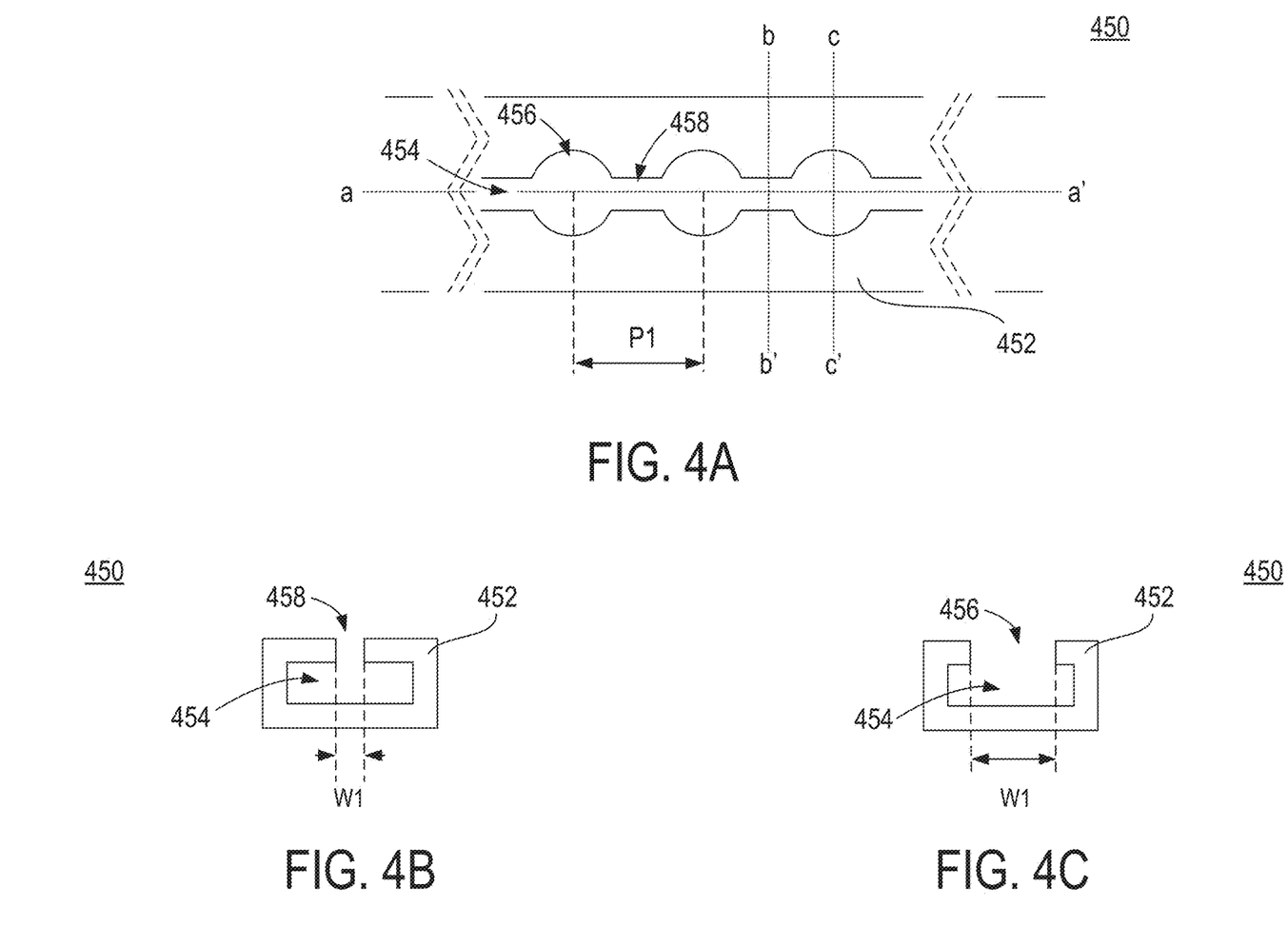
FIG. 4A is a top view of an example track, according to one embodiment described herein.
FIG. 4B is a cross-sectional view along line b-b' on the track shown in FIG. 4A.
FIG. 4C is another cross-sectional view along line c-c' on the track shown in FIG. 4A.
Figure 5A:
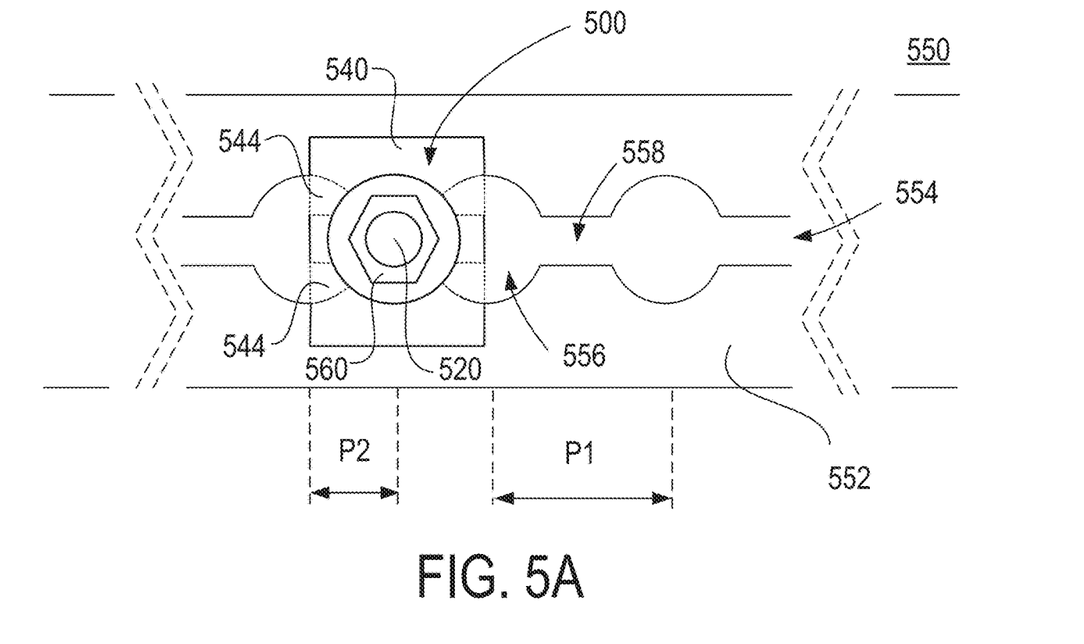
FIG. 5A is a top view showing an example fastening assembly installed on a track.
Figure 5B:
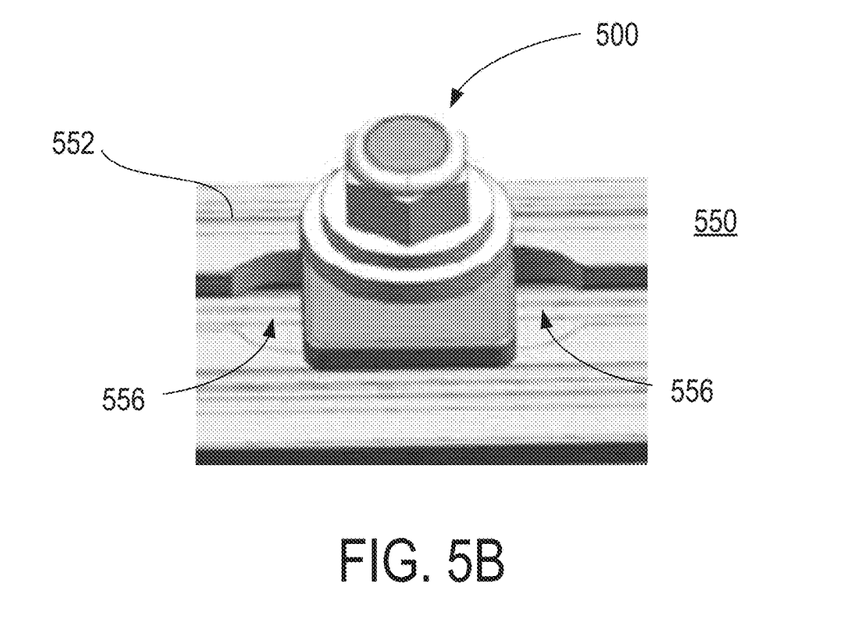
FIG. 5B is a perspective view showing an example fastening assembly installed on a track.

Turning now to FIGS. 4A-4C, an example track 450 is shown, according to some embodiments. In general, the track 450 may include a track body 452, and a channel 454 formed in the track body 452, where the channel 454 extends along a longitudinal dimension defined by line a-a', as shown in FIG. 4A.

The track 450 may also include a number of holes 456 connected to the channel 454. The holes 456 may be spaced apart along the longitudinal dimension of the track 450, and separated by a predetermined distance P1. The holes 456 may be shaped and sized to receive and engage with a variety of fasteners or fastening means. In some embodiments, the holes 456 may be shaped and sized to receive and engage a fastening assembly 100, according to embodiments described herein. For instance, in some embodiments, the holes 456 may be shaped and sized to allow a first portion 126 of a stud 120 through the holes 456, as described with reference to FIGS. 2A-2C. In addition, in some embodiments, the holes 456 may be shaped and sized to engage, at least in part, with members 144 of a keeper 140, as described with reference to FIGS. 3A-3C.

The holes 456 may also be connected by slits 458 in the track body 452 that extend along the channel 454, as shown in FIGS. 4A and 4B. In some embodiments, the shape and size of the slits 458 may allow a rod 124 from a stud 120 to move through the slits 458, as described with reference to FIGS. 2A-2C, but may not allow a first portion 126 of a stud base 122 of the stud 120 to move through the slits 458.

The track 450, in cooperation with a fastening assembly 100 according to embodiments described herein, may be used to secure various objects. The sizes, shapes and configuration of the track 450 may vary depending upon the specific application. For example, the track 450 may include any number of holes 456 and any number of slits 458; the exterior of the track body 452 may have any shape and dimensions; the interior profile of the channel 454 may have any shape and dimensions; and so forth. In some embodiments, the interior profile of the channel 454 may have a shape and dimensions that correspond to the stud base 122 of the stud 120 described with reference to FIGS. 2A and 2B. For example, a width of the channel 454 may be approximately equal to the diameter d1 of the first portion 126 of the stud base 122 shown in FIG. 2B. As may be appreciated, however, the width of the channel and diameter d1 need not be exactly equal, but may be within a small tolerance of each other (e.g. less than 0.1 inches, although other tolerances may be possible) to allow for the positioning of the stud base 122 in the channel. In other embodiments, the width of the channel may be larger than the diameter d1 of the first portion 126 of the stud base 122.

The track 450 may include a variety of other features, including various features for anchoring the track 450 in place. In some implementations, the track 450 may, for example, be anchored to a floor, wall, or ceiling. One or more objects may then be secured to the floor, wall, or ceiling by engaging one or more fastening assemblies 100 with the anchored track 450.

Turning now to FIGS. 5A and 5B, examples of a fastening assembly 500 installed on a track 550 are shown, in accordance with embodiments described herein. Referring specifically to FIG. 5A, the track 550 may include a track body 552 and a channel 554 formed in the track body 552. The track 550 may also include a number of holes 556 that are connected to the channel 554, and a number of slits 558 connecting the holes 556.

The fastening assembly 500, including a stud 520, a keeper 540, and a nut 560, may then be assembled and coupled to the track 550, as shown in the examples of FIGS. 5A and 5B. In some implementations, the fastening assembly 500 may be coupled to the track 550 by inserting the stud base (not shown) of the stud 520 into the channel 554, either through any one hole 556, or through another opening in the track body 552, such that the rod (not shown) protrudes upward from the channel 554 through a selected slit 558. The keeper 540 may be positioned over the rod, with the members 544 facing the rod, and the rod inserted through an opening (not shown) in the keeper base. The members 544 may then engage adjacent holes 556, on either side of the selected slit 558, on the track 550. The fastening assembly 500 may be secured to the track 550 by placing and securing the nut 560 onto the rod of the stud 520, as illustrated in FIG. 5B. As appreciated from FIG. 5A, the shape and size of the members 544 may correspond to the holes 556. Hence, the members 544 may prevent the keeper 540 from moving laterally along the channel 554 when the keeper 540 is positioned on the track 550.

The ordering of the above-described steps is not limiting, and may be performed in any order. In addition, while FIGS. 5A and 5B show members 544 with curved shapes that engage and match the circular holes 556 on the track 550, the size and shape of the members 544 and holes 556 are not so limited. For instance, in one example, the holes 556 may have a rectangular shape. At least a portion of the members 544 may then have a corresponding shape (i.e. rectangular). In another example, the holes 556 may have a diamond shape. At least a portion of the members 544 may then have a corresponding shape (i.e. triangular). Furthermore, although FIGS. 5A and 5B show the fastening assembly 500 directly secured to the track 550, it may be appreciated that the fastening assembly 500 may also secure objects thereto. For example, various objects (e.g. washers, flanges, and so forth), as well as various object components, may be disposed between the keeper 540 and nut 560 to secure them to the track 550 once the fastening assembly 500 is secured.

When installed, the fastener assembly 500 can be positioned over a slit 558 at a predetermined distance P2 away from a center of any one hole 556. More particularly, the members 544 retain the fastening assembly 500 in a position over a slit 558 on the track 559, at the predetermined distance P2 from a hole 556 on the track 550. As appreciated from FIGS. 5A and 5B, the configuration of the fastening assembly 500 may allow for securing objects to the track 550 at distances that are less than the spacing P1 between the holes 556, and/or at positions that do not coincide with, or are offset from, the centers of the holes 556. In some applications, the ability to offset and secure objects along the track 550, using fastener assemblies in accordance with the present disclosure, can enhance object placement efficiency. For example, seats secured to the track 550 using the fastener assembly 500 may be placed closer together, which can increase seating capacity without need for costly modifications or replacement of the track 550.

Figure 6:
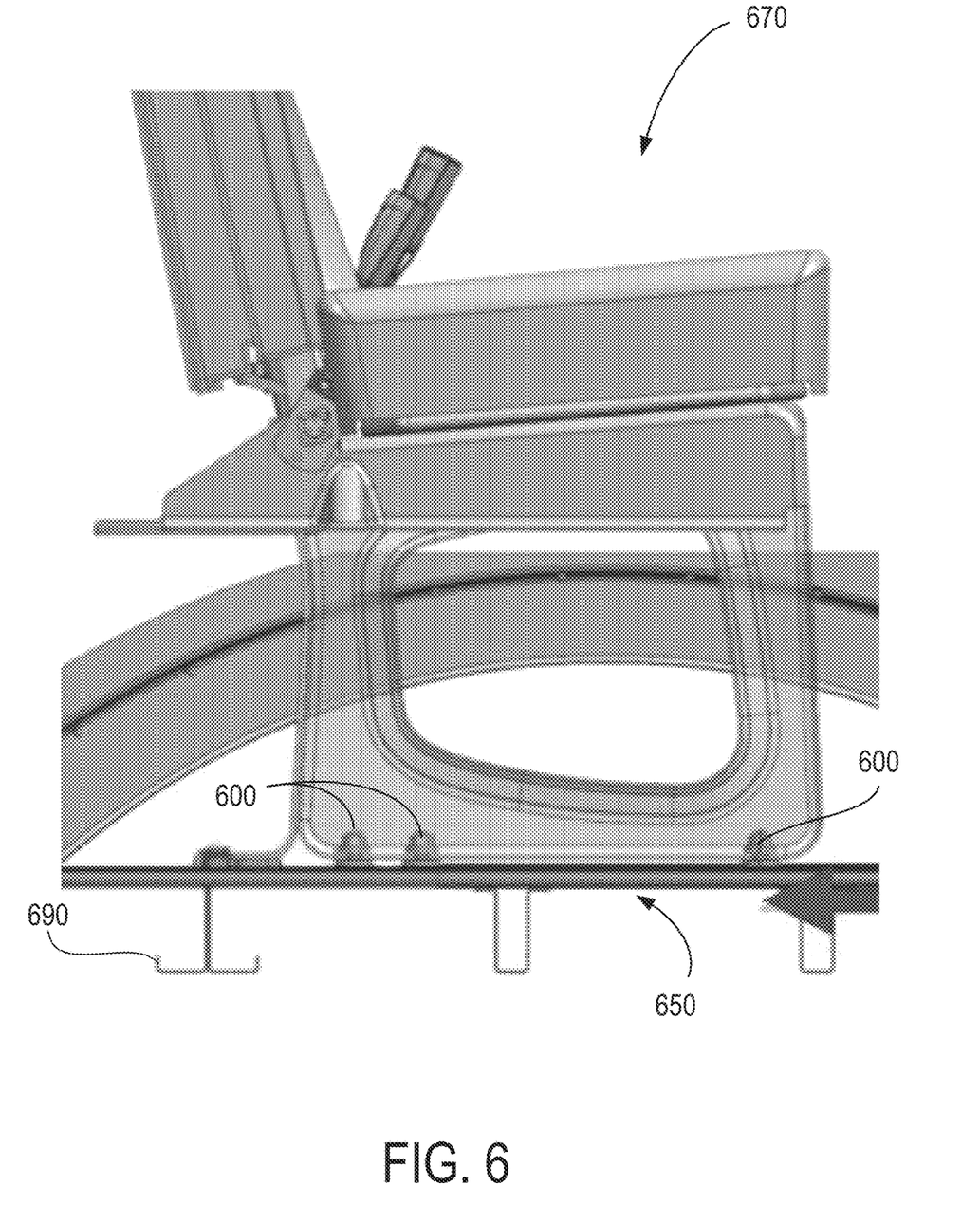
FIG. 6 is an illustration showing an example application in which a fastening assembly, according to embodiments described herein secures a seat.

FIG. 6 shows one example application for using a fastening assembly, according to embodiments described herein. As shown in FIG. 6, this application may use a number of fastening assemblies 600 to secure an object, namely a seat 670, to a track 650. The type of seat 670 used in the example shown in FIG. 6 is also not particularly limited, and can include single seats, double seats, benches, stools, etc. In this example, each fastening assembly 600 may be positioned in a different section of the track 650, and the seat 670 can be secured by fastening each fastening assembly 600, as described. The track 650 may be connected to an anchor 690 as shown, which can be used to secure the track 650 to a surface or object.

While three fastening assemblies 600 are used in FIG. 6 to secure the seat 670, any number of fastening assemblies 600 can be used to secure any object, including a single fastening assembly 600. Also, while FIG. 6 shows multiple fastening assemblies 600 being used to secure a single object, namely seat 670, a single fastening assembly 600 can be used to secure a single object (i.e. seat 670).

The surface or object to which the track 650 may be anchored is not particularly limited and may, for example, include a vehicle floor, an airplane floor, a train floor, as well as a building structure, a wall, a ceiling, a sidewalk, and so forth. In addition, various objects beyond the seat 670 shown in FIG. 6 may be secured using fastening assemblies, as described. As non-limiting examples, objects that may be secured include a table, a light fixture, a support beam, a hand railing, a shelf, a duct, a fan, a light fixture, a pipe, a board (e.g. chalkboard, whiteboard), a painting, and so forth.

According to one embodiment, a fastening assembly for a track comprises a stud having a stud base and a rod extending from the stud base, and a keeper comprising a keeper base with an opening in a center of the keeper base, and at least two members extending from the keeper base, wherein a size and a shape of the opening corresponds to the rod. The fastening assembly further comprises a nut that receives and engages the rod to secure the stud to the keeper. In one embodiment, the keeper has four members extending from the keeper base. In another embodiment, the opening has a diameter that is approximately equal to the diameter of the rod. In yet another embodiment, the stud base further comprises a first portion and a second portion, and at least one dimension of the second portion is smaller than at least one dimension of the first portion. In yet another embodiment, the keeper base and the at least two members define a space that corresponds to the second portion of the stud base. In yet another embodiment, the rod comprises a threaded portion that connects to the second portion of the stud base. In yet another embodiment, the fastening assembly engages with a track comprising a track body, a channel formed in the track body, a plurality of holes that are connected to the channel, and a plurality of slits that connect the plurality of holes. In yet another embodiment, at least one of a dimension, a shape, and a position of the at least two or more members is selected to correspond to at least a portion of the holes. In yet another embodiment, the at least two members retain the fastening assembly in a position over a slit on the track and at a predetermined distance from a hole on the track.

According to another embodiment, a fastening assembly for a track comprises a stud having a stud base and a rod extending from the stud base, and a keeper comprising a keeper base with an opening in a center of the keeper base, and at least two members extending from the keeper base, wherein at least one of a dimension, a shape, and a position of the at least two or more members is selected to correspond to one or more holes on a track. The fastening assembly also comprises a nut that receives and engages the rod to secure the stud to the keeper. In one embodiment, the at least two members retain the fastening assembly in a position over a slit on the track and at a predetermined distance from a hole on the track. In another embodiment, the keeper has four members extending from the keeper base. In yet another embodiment, a size and a shape of the opening corresponds to the rod. In yet another embodiment, the opening has a diameter that is approximately equal to the diameter of the rod. In yet another embodiment, the stud base further comprises a first portion and a second portion, and at least one dimension of the second portion is smaller than at least one dimension of the first portion.

A fastening assembly for a track is provided. According to one embodiment, the fastening assembly includes a stud having a stud base and a rod extending from the stud base, and a keeper that includes a keeper base with an opening in a center of the keeper base, and at least two members extending from the keeper base, wherein a size and a shape of the opening corresponds to the rod. The assembly also includes a nut that receives and engages the rod to secure the stud to the keeper.

According to another embodiment, the fastening assembly includes a stud having a stud base and a rod extending from the stud base, and a keeper that includes a keeper base with an opening in a center of the keeper base, and at least two members extending from the keeper base, wherein at least one of a dimension, a shape, and a position of the at least two or more members is selected to correspond to one or more holes on a track. The fastening assembly also includes a nut that receives and engages the rod to secure the stud to the keeper

The invention claimed is:
1. A track assembly comprising:
a track comprising a track body;
a channel formed in the track body;
a plurality of holes connected to the channel;
a plurality of slits connecting the plurality of holes;
one or more fastening assemblies each comprising a keeper with a keeper base, a stud with a stud base, a rod with a first diameter extending from the stud base, and a nut, wherein the stud base comprises a first portion having a second diameter and a second portion having a pre-determined length, the pre-determined length extending up to the second diameter of the first portion and a pre-determined width, smaller than the second diameter of the first portion, the keeper base has an opening with a third diameter proportioned to receive the first diameter of the rod and at least two members extending down from the keeper base, and wherein the nut receives and engages the rod to secure the stud to the keeper;
the track configured to retain two or more of the fastening assemblies in consecutive slits of the plurality of slits connecting to the plurality of holes.

2. The track assembly of claim 1, wherein at least one of a dimension, a shape and a position of the at least two members of the keeper base of the one or more fastening assemblies corresponds to at least a portion of the plurality of holes.

3. The track assembly of claim 2, wherein the at least two members of the keeper base are insertable into one or more of the plurality of holes.

4. The track assembly of claim 3, wherein the at least two members retain the fastening assembly over the slit on the track at a predetermined distance from one or more of the plurality of holes.

5. The track assembly of claim 1, wherein the stud is rotatable in the plurality of holes and slidable in the plurality of slits connected to the plurality of holes.

* * * * *